Aug. 13, 1929. R. LEWIS 1,724,606
AWNING
Filed May 2, 1927 4 Sheets-Sheet 2
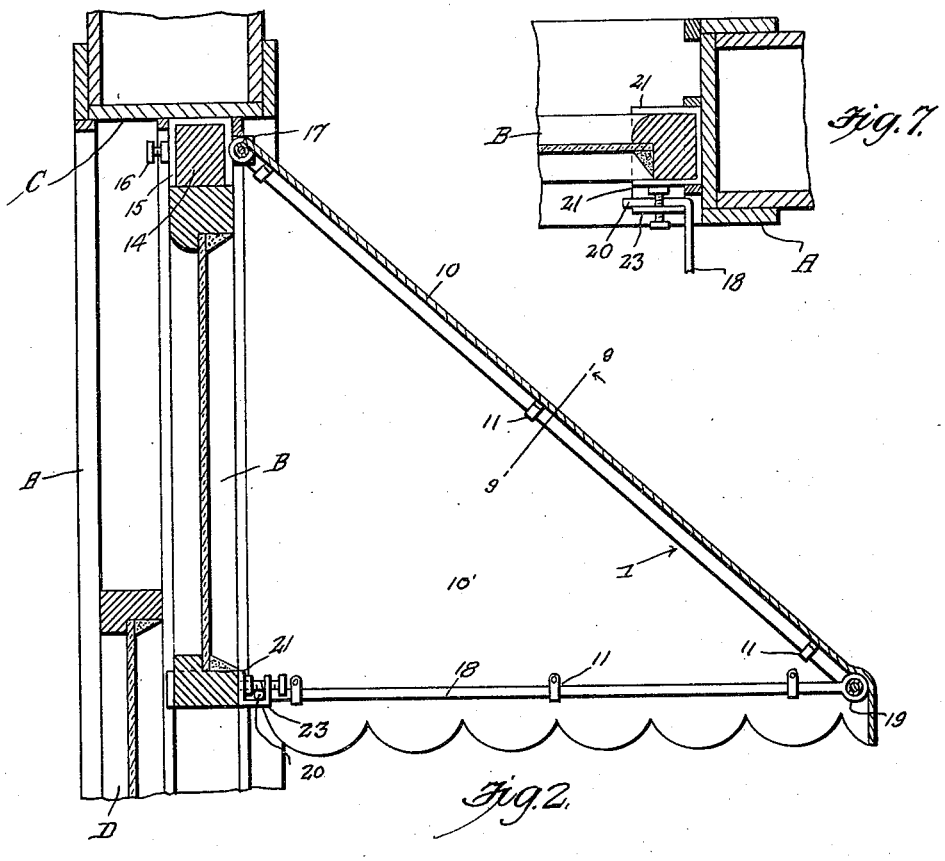
Fig. 7.
Fig. 2.
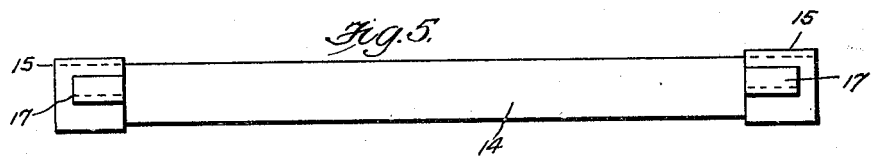
Fig. 5.
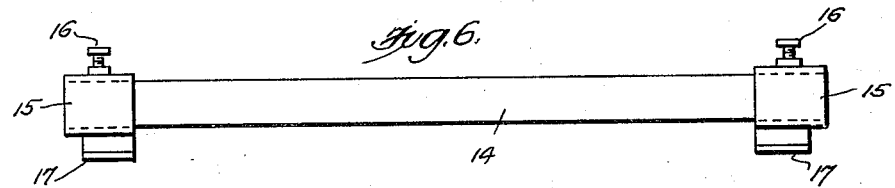
Fig. 6.
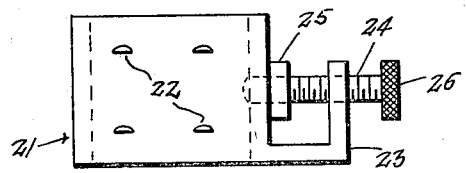
Fig. 8.
Inventor
Roy Lewis,
By Clarence A. O'Brien
Attorney

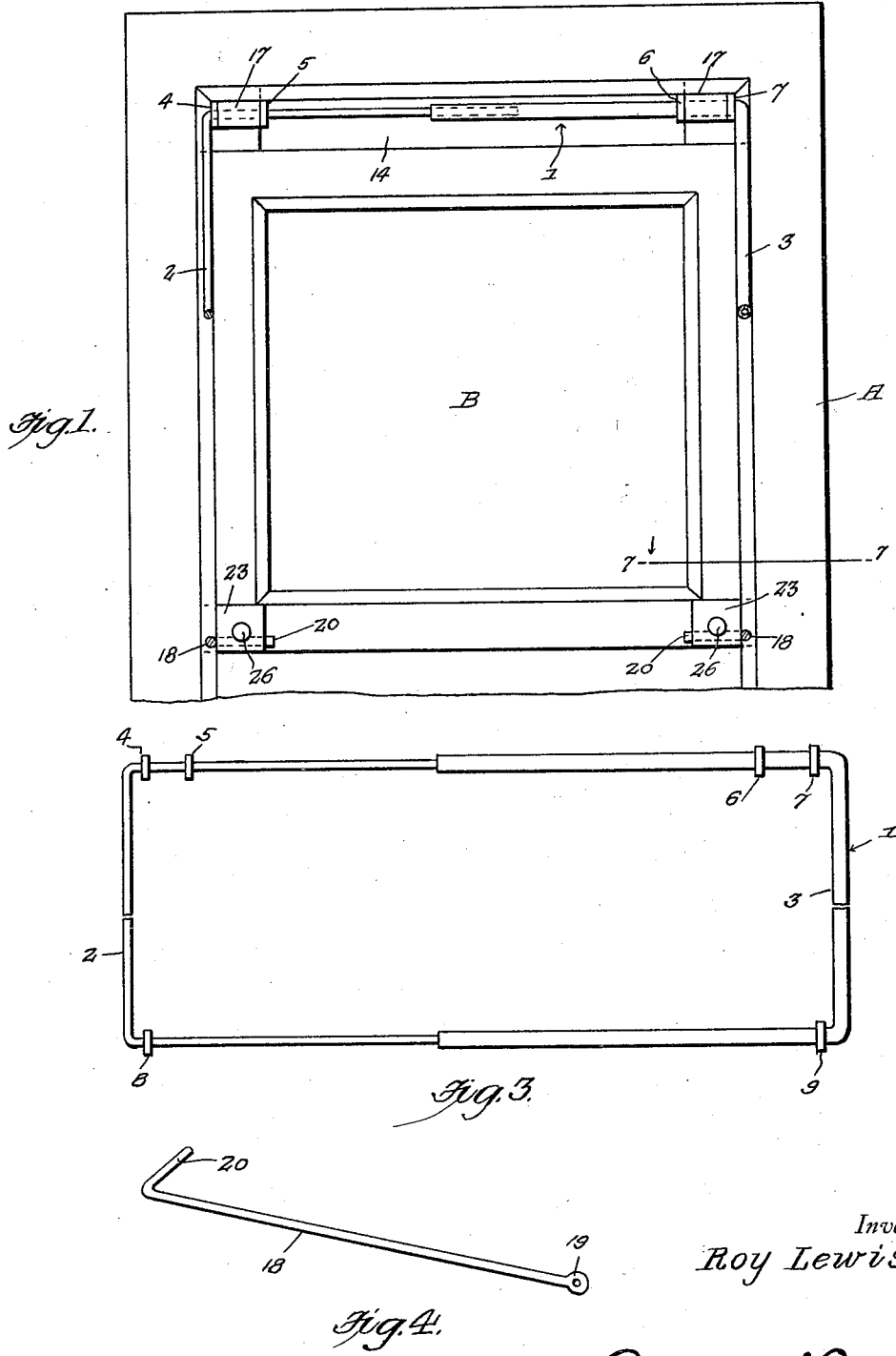

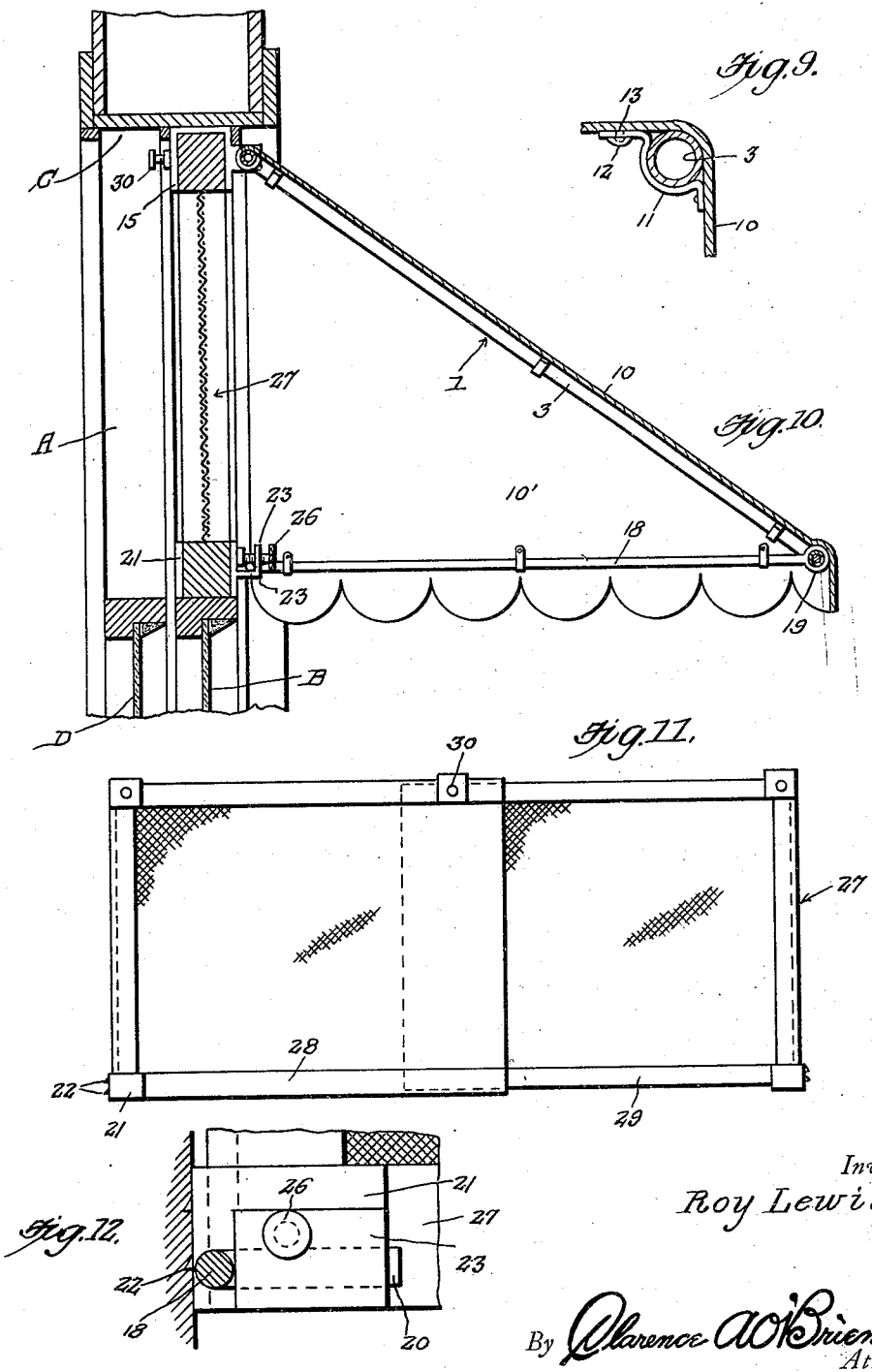

Aug. 13, 1929.  R. LEWIS  1,724,606
AWNING
Filed May 2, 1927   4 Sheets-Sheet 4
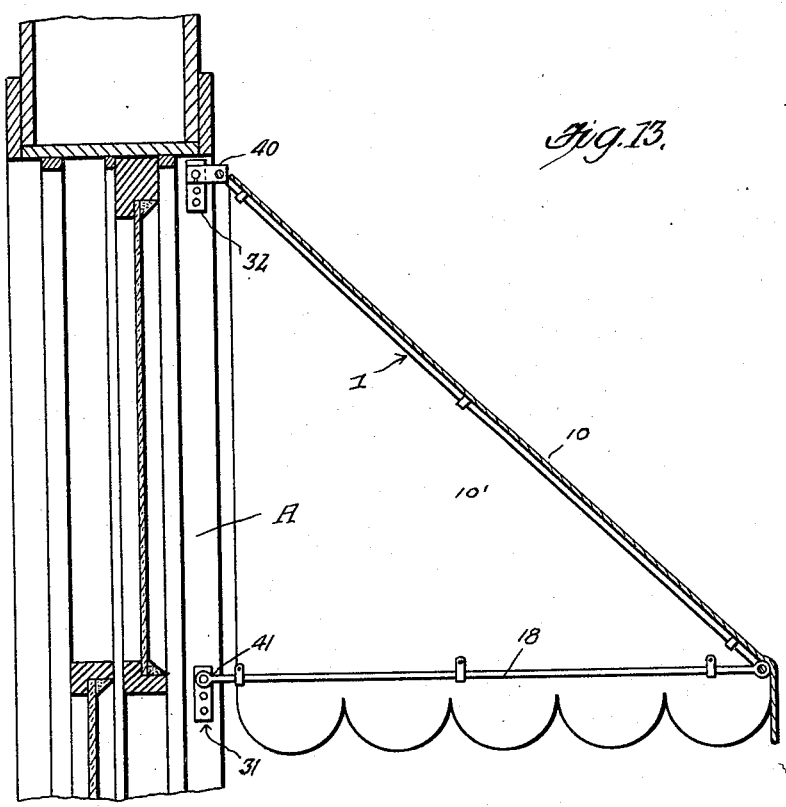
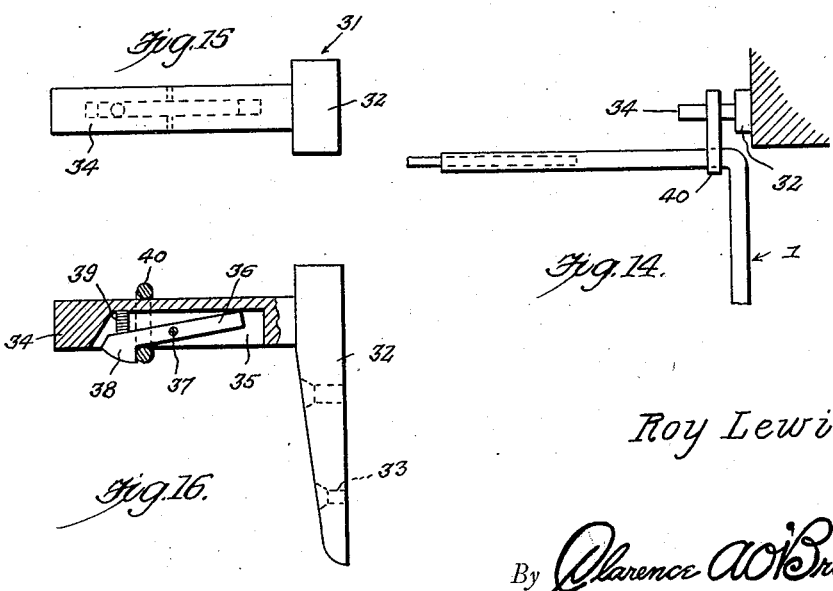
Inventor
*Roy Lewis,*
By *Clarence A. O'Brien*
Attorney Patented Aug. 13, 1929.

1,724,606

UNITED STATES PATENT OFFICE.

ROY LEWIS, OF PLYMOUTH, PENNSYLVANIA.

AWNING.

Application filed May 2, 1927. Serial No. 188,210.

The present invention relates to improvements in awnings and has for its principal object to provide an awning for use upon windows of a building and more particularly for association with windows which include a frame and sliding upper and lower sashes.

One of the important objects of the present invention is to provide an awning which can be readily and easily attached in proper position on the window without necessitating any material alterations of the parts of the window with which the awning is to be associated, the awning being at all times secured in a lowered position to protect against sun rays, rain or snow.

A further object is to provide an awning wherein the same includes a frame, and a covering therefor, means being provided for detachably securing the covering over the frame whereby the covering may be removed and washed or replaced with a new one whenever necessary.

A further object is to provide an awning of the above mentioned character which is simple in construction, inexpensive, strong and durable and further well adapted to the purpose for which it is designed.

Other objects and advantages of the invention will become apparent from the following description taken in connection with the accompanying drawings;

In the accompanying drawings forming part of this application:

Figure 1 is a fragmentary front elevation of a window showing the cross bar extending transversely across the window frame between the upper edge of the upper sash and the top of the window frame and also disclosing the upper end portions of the sides of the frame of the awning and the attaching bracket therefor.

Figure 2 is a vertical sectional view through the awning showing the manner in which the same is associated with the window, and for more clearly disclosing the manner in which the cross bar is arranged within the window frame and the attaching brackets for the awning frame.

Figure 3 is a plan view of the awning frame, the sides being broken away.

Figure 4 is a detail perspective view of one of the horizontally disposed awning frame supporting arms.

Figure 5 is a side elevation of the cross bar with the awning frame attaching brackets secured thereon.

Figure 6 is a top plan view thereof.

Figure 7 is a sectional view taken approximately on the line 7—7 of Figure 1 looking in the direction of the arrows.

Figure 8 is a detail elevational view of one of the lower brackets.

Figure 9 is a sectional view taken approximately on the line 9—9 of Figure 2 for more clearly disclosing the means for detachably securing the covering over the awning frame.

Figure 10 is a view similar to Figure 2 showing the same construction of the awning with the exception of the cross bar which is eliminated in this form, the awning in this Figure being shown in conjunction with a screen which is supported between the upper edge of the upper sash which is lowered and the top of the window frame.

Figure 11 is a side elevation of the screen.

Figure 12 is a detail view of one of the lower brackets showing the manner in which the same is secured to the screen at one of the lower corners thereof, and also the manner in which the bracket engages the adjacent side of the window frame.

Figure 13 is a view similar to Figures 2 and 10, and disclosing another form of awning securing means wherein the attaching brackets are directly secured to the window frame.

Figure 14 is a top plan view of one of the brackets showing the manner in which the top portion of the awning frame is secured thereon.

Figure 15 is a top plan view of one of the brackets, and

Figure 16 is a side elevation thereof, a portion of the bracket being broken away to more clearly disclose the manner in which the locking dog engages the link member carried by the upper side of the awning frame.

In the drawings with reference more particularly to Figures 1 to 9 inclusive, the numeral 1 designates generally the substantially rectangular shaped frame of the awning, the same being preferably formed of tubular material and the frame is divided into the sections 2 and 3 respectively. These sections are telescopically connected together at their upper and lower portions as is more clearly shown in Figure 3, whereby the awnings may be used upon window frames of various widths. A pair of spaced collars 4 and 5, respectively are arranged on the upper arm of the section 2 of the adjustable awning frame 1. A similar pair of spaced collars designated generally by the numerals 6 and 7 respectively are arranged on the upper arm of the complementary section 3. The lower arm of each of the aforementioned sections has arranged thereon a single collar, the collar on the lower arm of the section 2 being designated by the numeral 8, while the collar on the lower arm of the complementary section 3 is designated by the numeral 9. The purpose of the aforementioned collars will be hereinafter more fully described.

A covering 10 of any desired material is disposed over the frame 1, and the covering also extends downwardly along the sides of the frame as clearly shown in Figure 2. This covering is detachably secured on the frame through the medium of the strap members 11 and are attached at one end to the covering 10 on one side of the frame 1. The other end of each strap member is provided with a socket 12 which detachably engages over a head 13 carried by the covering 10 and disposed on the opposite side of the frame and the manner in which each of these strap members engages around the frame 1 and is secured to the covering is clearly disclosed in Figure 9.

As many of these fasteners may be employed as is desired, and by providing a fastening means of this character, the covering can be readily removed and washed or replaced with the new covering whenever it becomes necessary.

An elongated cross bar 14 is adapted to be disposed between the sides of the window frame A and it is furthermore arranged between the upper edge of the sliding upper window sash B and a top C of the window frame in the manner as clearly shown in Figure 2. In this instance, the awning is to be associated with a window wherein the same includes a pair of sliding window sashes. It is of course necessary to slightly lower the upper sash B in order to permit the installation of the cross bar 14.

A substantially inverted U-shaped bracket 15 is disposed over each end of the cross bar, and the set screw 16 is threaded through the rear side of each of these brackets for engagement with the inner side face of the cross bar, whereby the brackets will be rigidly attached on the cross bar.

A hook 17 is formed on the front side of each bracket 15 and the hook is open at its top and is substantially channel shaped to accommodate the upper arms of the telescopic sections 2 and 3 constituting the awning frame 1, and as is clearly shown in Figure 1, the spaced collars 4 and 5 will be disposed adjacent the opposite ends of the left hand bracket 15, while the spaced collars 6 and 7 will be disposed against the adjacent ends of the right hand brackets secured on the cross bar 14, thus locking the complementary telescopic sections of the awning frame against sliding movement with respect to each other, and when the upper portion of the frame is supported in the hook, a positive connection between the cross bar 14 and the awning frame 1 will be provided.

The awning frame 1 is disposed in angular relation with respect to the window frame and for supporting the lower portion of the awning frame in properly spaced relation with respect to the window, I provide the horizontal supporting arms shown at 18 with reference more particularly to Figure 4 of the drawings. Two of such arms are provided and the outer end of each arm is formed with an eye 19 for engagement with the lower portion of the awning frame 1, and the collars 8 and 9 which are spaced from the sides of the awning frame will cooperate therewith in retaining the outer ends of the supporting arms 18 in proper position with respect to the lower portion of the awning frame. It is of course to be understood that the outer end portion of each of these horizontally disposed supporting arms is so constructed as to permit the same to be placed over the lower arms of the complementary telescopic sections of the awning frame 1, whereby they may be arranged between the respective collars and the adjacent sides of the awning frame.

A laterally disposed hook 20 is formed on the inner end of each arm. A substantially U-shaped bracket 21 extends around the upper sash B at each of the lower corners thereof, the base portion of this U-shaped bracket being disposed across the side edge of the sash, while the arms of each U-shaped bracket are disposed against the front and rear faces of the sides of the upper window sash B in the manner as clearly shown in Figure 7.

Teeth 22 are formed on the outer face of the base portion of each U-shaped bracket 21 for biting engagement with the adjacent side of the window frame A. A hook shaped member 23 is formed on the front side of each bracket. A bolt 24 is threaded through a suitable opening provided therefor in the upstanding side of each of these hook members 23, and the inner end of this bolt enters an opening provided therefor in the adjacent side or arm of the U-shaped bracket 21 as clearly illustrated in Figure 8. A nut 25 is threaded on the inner end of this bolt 24 for disposition against the outer face of the arm of the U-shaped bracket 21. The purpose of this bolt is to provide a means for retaining the laterally disposed end 20 of each horizontally disposed supporting arm 18 within the respective hook shaped member 23 and the knurled head 26 is formed on the outer end of each bolt to facilitate the rotation thereof.

As is clearly shown in Figure 2, the covering 10 is formed with the side portion 10' which extend over the area formed by the angularly disposed awning frame 1 and the horizontal supporting arms 18 and the portion of the side covering 10' which is disposed adjacent the horizontal supporting arm is attached thereto by the same fastening means as employed for securing a covering to the side and top and lower portions of the frame 1.

Now with reference to Figures 10, 11 and 12, of the drawings, there is shown an awning structure which is used in conjunction with a window screen designated generally by the numeral 27 and which screen includes the slidable sections 28 and 29, respectively, in order to permit the sections to be adjusted to accommodate window frames of various widths and any appropriate securing means such as is shown at 30 is provided for securing the adjacent ends of the slidable sections together. This window screen is disposed between the sides of the window frame A, the upper sash B being lowered to substantially the same level as the lower sash D, and the bottom of the window screen 27 will rest on the upper end of the sash B, while the upper edge of the screen will be adapted to engage a top portion C of the window frame in the manner clearly shown in Figure 10.

In this form of the invention, a cross bar 14 is not employed, and the upper pair of brackets 15 are engaged over the upper portions of the slidable sections 28 and 29 comprising the window screen 27 and the lower bracket 21 instead of being connected to the lower corners of the upper sliding window sash B, they are secured to the lower corners of the window screen 27. Otherwise the awning construction is identical with that heretofore described. This will permit the awning to be used with the upper sash opened to its fullest extent, and to permit a window screen to be placed in the opening in order to keep out insects and the like and at the same time enable the awning to be secured in proper position on the outside of the window.

With reference now to Figures 13, 14, 15 and 16, respectively, there is shown a modified structure of the bracket construction wherein the awning is to be mounted on a window whose sashes are not so constructed as to permit the upper sash to move downwardly. In this respect, four brackets such as are shown generally at 31 are provided, one pair being provided for the upper portion of the awning frame, while the other pair are provided for cooperation with the inner hooked ends of the horizontal supporting arms 18. As all of the brackets are of the same construction, the description of one is thought to suffice for the description of all.

Each bracket comprises a plate-like portion 32 which is provided with suitable openings 33 to accommodate fastening screws or the like which are to be driven into the sides of the window frame A so that the brackets will be secured adjacent the outer side of the window. An elongated pintle 34 extends laterally from the upper portion of the plate 32, and this pintle is formed with a cut out portion 35 in the bottom thereof.

A pawl or dog 36 is pivotally secured intermediate its ends within this cut out portion 35 as at 37, and the headed end 38 of this pivoted pawl or dog is normally disposed outwardly of the slot or cut out portion 35 through the medium of the expansible coil spring 39 which is interposed between the pivoted pawl or dog and the closed side of the pintle slot or cut out portion 35 in the manner clearly shown in Figure 16.

A plate-like link 40 is secured on the upper portion of the awning frame adjacent each side thereof, and the outwardly projecting end of each link is formed with an opening to accommodate the respective upper pintle 34 and as this link 40 is moved along the pintle toward the plate 32, the same will engage the rounded nose of the headed end 38 of the pivoted pawl or dog 36 and force the same inwardly and as soon as the link passes the headed pin 38, the spring 39 will automatically project the headed end of the pawl outwardly into the position shown in Figure 16, thereby locking the link against outward sliding movement on the respective pintle in the manner as also clearly disclosed in Figure 16 of the drawings.

The inner ends of the horizontal supporting arms 18 instead of being provided with the hooks 20 are formed with eyes 41 for slidable engagement over the lower pair of pintles in the same manner as the links 40 engage the upper pair of pintles.

It will thus be seen from the foregoing description, that I have provided an awning construction for windows which may be readily and easily attached for disposition on the outside of the window to protect against the sun, rain, or snow, and due to its simplicity the awning may be readily and easily assembled or disassembled, and furthermore the same will not mar the appearance of the window when attached thereto.

An awning constructed in accordance with the present invention may furthermore be manufactured at a very low cost and will also be strong and durable.

While I have shown the preferred embodiment of my invention, it is to be understood that various changes in the size, shape and arrangement of parts may be resorted to without departing from the spirit of the invention and the scope of the appended claims.

Having thus described the invention, what

I claim as new and desire to secure by Letters Patent is:—

1. In an awning, a frame, a covering therefor, means for detachably securing the covering on the frame, said means comprising a flexible strap secured at one end to the covering and adapted to extend around and underneath of the adjacent side of the frame, a socket member carried by the free end of the strap, and a head member attached to the covering over which the socket member engages, a series of such fastening devices being associated with the covering at spaced intervals.

2. In an awning for windows wherein the latter includes a frame, and sliding window sashes, an awning frame, a covering therefor, a cross bar disposed transversely between the sides of the window frame, and arranged between the upper edge of the upper sash which is slightly lowered and the top of the window frame, a pair of substantially U-shaped brackets secured on the end portions of the cross bar, a hook shaped member formed on the front side of each bracket, the upper portion of the awning frame being disposed across the front side of the cross bar and seated in said hook shaped members, collars arranged in pairs on the upper portion of the awning frame for cooperation with the adjacent ends of each of the hook shaped members to prevent sliding movement of the awning frame laterally, said awning frame being disposed in angular relation with respect to the window, supporting arms connected at their outer ends to the lower portion of the awning frame, U-shaped brackets secured on the lower corners of the upper window sash, and connecting means between the inner ends of the horizontal supporting arms and said last mentioned brackets to provide a rigid structure.

3. In an awning for windows wherein the latter includes a frame, and sliding window sashes, an awning frame, a covering therefor, a cross bar disposed transversely between the sides of the window frame, and arranged between the upper edge of the upper sash which is slightly lowered and the top of the window frame, a pair of substantially U-shaped brackets secured on the end portions of the cross bar, a hook shaped member formed on the front side of each bracket, the upper portion of the awning frame being disposed across the front side of the cross bar and seated in said hook shaped members, collars arranged in pairs on the upper portion of the awning frame for cooperation with the adjacent ends of each of the hook shaped members to prevent sliding movement of the awning frame laterally, said awning frame being disposed in angular relation with respect to the window, supporting arms connected at their outer ends to the lower portion of the awning frame, U-shaped brackets secured on the lower corners of the upper window sash, and connecting means between the inner ends of the horizontal supporting arms and said last mentioned brackets to provide a rigid structure, said last mentioned means comprising a hook shaped keeper formed on each of the last mentioned brackets, the inner end of each supporting arm being disposed laterally for disposition in the respective keeper.

4. In an awning for windows wherein the latter includes a frame, and sliding window sashes, an awning frame, a covering therefor, a cross bar disposed transversely between the sides of the window frame, and arranged between the upper edge of the upper sash which is slightly lowered and the top of the window frame, a pair of substantially U-shaped brackets secured on the end portions of the cross bar, a hook shaped member formed on the front side of each bracket, the upper portion of the awning frame being disposed across the front side of the cross bar and seated in said hook shaped members, collars arranged in pairs on the upper portion of the awning frame for cooperation with the adjacent ends of each of the hook shaped members to prevent sliding movement of the awning frame laterally, said awning frame being disposed in angular relation with respect to the window, supporting arms connected at their outer ends to the lower portion of the awning frame, U-shaped brackets secured on the lower corners of the upper window sash, connecting means between the inner ends of the horizontal supporting arms and said last mentioned brackets to provide a rigid structure, said last mentioned means comprising a hook shaped keeper formed on each of the last mentioned brackets, the inner end of each supporting arm being disposed laterally for disposition in the respective keeper, and a bolt extending transversely in the open top portion of the keeper to prevent the vertical displacement of the laterally disposed end of each supporting arm from its keeper.

5. In an awning for windows wherein the latter includes a frame and sliding window sashes, an awning frame, a covering therefor, a pair of attaching brackets for the upper portion of the awning frame to secure the same adjacent the top of the window frame, said awning frame being disposed in angular relation with respect to the window frame, a pair of horizontally supporting arms disposed at the outer ends to the lower portions of the awning frame, and additional attaching brackets connected to the inner ends of the supporting arms for securing said arms at the intermediate portion of the window frame.

In testimony whereof I affix my signature.

ROY LEWIS.